UNITED STATES PATENT OFFICE.

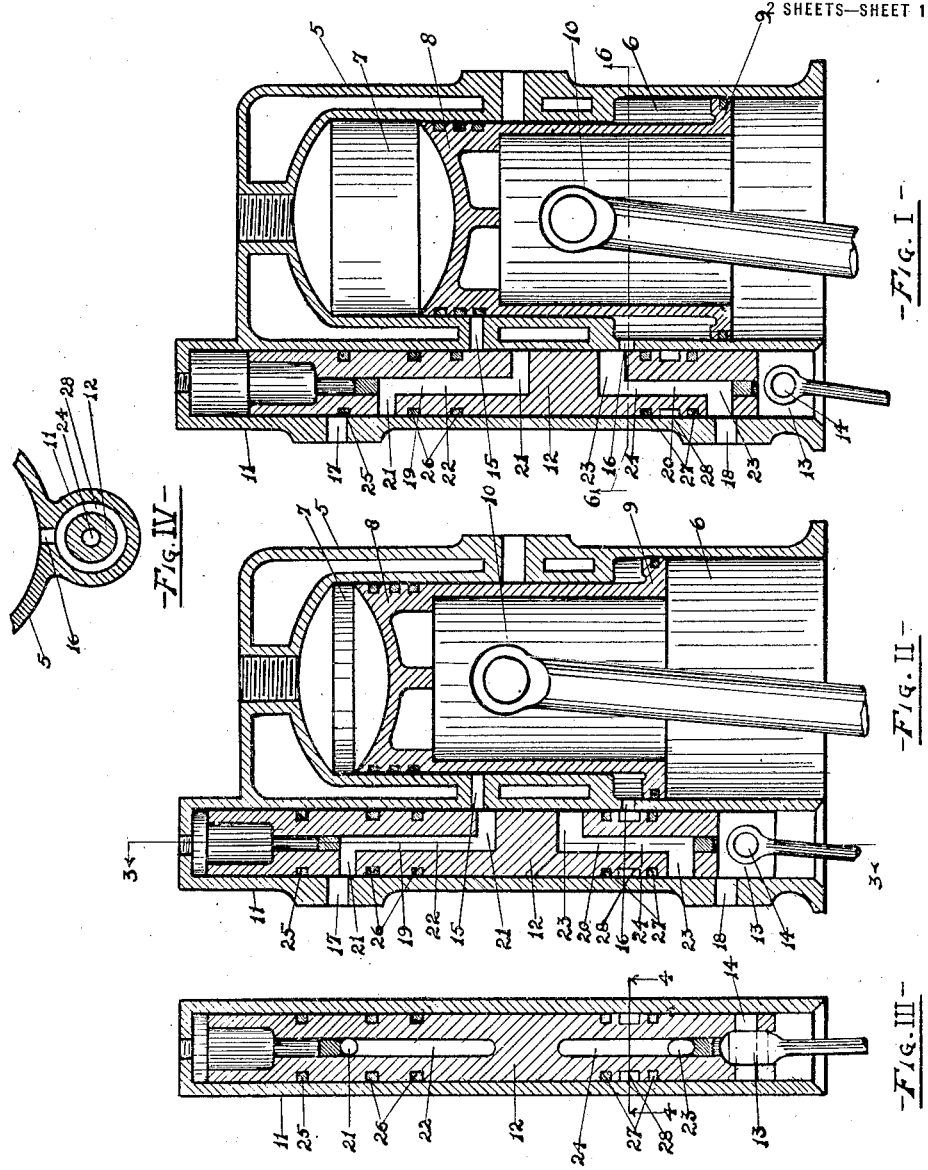

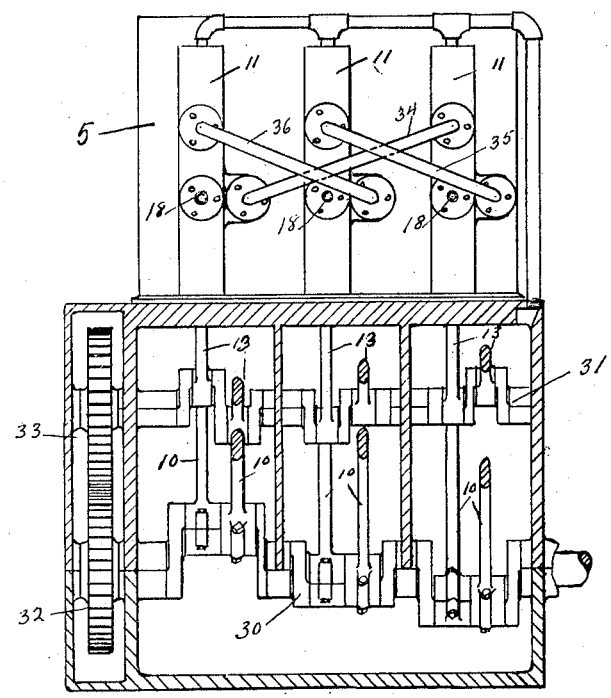
Fig. V
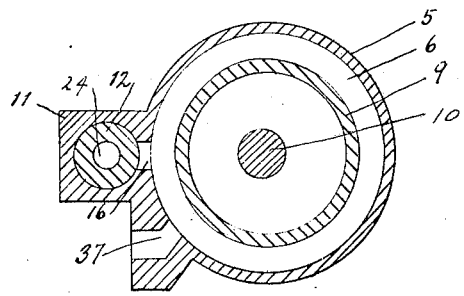
Fig. VI

DESIRÉ V. BOUREAU, OF DETROIT, MICHIGAN.

PISTON-VALVE.

1,358,514.  Specification of Letters Patent.  Patented Nov. 9, 1920.

Application filed February 26, 1916, Serial No. 80,736. Renewed May 13, 1918. Serial No. 234,353.

*To all whom it may concern:*

Be it known that I, DESIRÉ V. BOUREAU, a citizen of the French Republic, residing at Detroit, in the county of Wayne and State of Michigan, have invented certain new and useful Improvements in Piston-Valves, of which the following is a specification.

This invention relates to improvements in piston valves and particularly to piston valves for use in connection with internal combustion engines. This piston valve is particularly designed for use in connection with internal combustion engines of the type shown in my pending application, Serial Number 67,313, filed December 17th, 1915. However this valve is not limited to use in this connection but may be used in many other situations.

The objects of my invention are:

First, to provide a piston valve mechanism comprising a casing having inlet and outlet ports, a piston valve having a passage therein connecting said ports, and means to prevent the passage of gas from one port to the other around the piston valve.

Second, to provide, in a piston valve mechanism, means for equalizing the pressure of compressed gas against the side of the piston valve.

Further objects, and objects relating to economies of manufacture and details of construction will definitely appear from the detailed description to follow.

I accomplish the objects of my invention by the devices and means described in the following specification. The invention is clearly defined and pointed out in the claims.

A structure constituting a preferred embodiment of my invention is clearly illustrated in the accompanying drawings forming part of this specification, in which:

Figure I is a vertical, sectional view through an engine cylinder, piston valve and valve casing showing the parts in the position they occupy when the intake port of the pre-compression chamber is beginning to open.

Fig. II is a view, similar to Fig. I, showing the position of the parts as the engine piston approaches the upper limit of its stroke.

Fig. III is a vertical, sectional view on the section line 3—3 of Fig. II.

Fig. IV is a transverse, sectional view on the section line 4—4 of Fig. III.

Fig. V is a vertical, longitudinal view through an engine constructed in accordance with my pending application, Number 67,313, and equipped with piston valves constructed in accordance with my invention.

Fig. VI is a transverse, sectional view taken on the line 6—6 of Fig. I.

In the drawings, similar reference characters refer to similar parts throughout the several views, and the sectional views are taken looking in the direction of the little arrows at the ends of the sectional lines.

Considering the numbered parts of the drawing, the engine cylinder 5 is of two diameters forming a lower, precompression chamber 6 and an upper combustion chamber 7. A two diameter piston works in said cylinder having an upper piston head 8 working in the combustion chamber 7 and a lower piston head 9 working in the precompression chamber 6. The piston is connected by connecting rod 10 with a suitable crank-shaft, 30.

Formed integral with the cylinder casing is a cylindrical valve casing 11 in which the piston valve 12 is reciprocable longitudinally. The rod 13 is connected by pin 14 to the lower end of said piston valve and the piston valve is reciprocated thereby so as to open and close the ports at the proper points in the stroke of the engine piston, the rods 13 of the respective piston valves being connected to a counter crank shaft 31 which is driven by crank shaft 30 through the gears 32 and 33. The combustion chamber and the pre-compression chamber are each provided with intake ports 15 and 16 respectively, connecting said chambers with the interior of said valve casing. The side wall of the valve casing 11 is provided with ports 17 and 18 coöperating with the ports 15 and 16 respectively. The port 17 is connected by a pipe, 34, 35 or 36, with the outlet port 37 of the pre-compression chamber of another cylinder. The port 18 is connected to an intake manifold. Passages 19 and 20 are provided extending through the piston valve 12 and so disposed as to connect ports 15 and 17 and ports 16 and 18 at certain positions of the piston valve 12 relative to the casing 11. The passage 19 comprises transverse portions 21 connected by a longitudinal portion 22 so that one end of the passage 19 is higher than the other. Similarly the passage 20 comprises transverse portions 23 connected by a longitudinal portion 24. The piston valve 12 carries a compression ring 25 above the upper end of passage 19, a pair of compression rings 26 between the ends of passage 19 and a pair of compression rings 27 between the ends of passage 20. An annular groove 28 encircles the valve 12 between the compression rings 27, said groove being so located that, as the engine piston approaches the upper limit of its stroke, said groove is in line with port 16.

In Fig. V, I have shown an engine of the V-type provided with six cylinders in two blocks of three cylinders each. The three cylinders are connected together as shown. The lower intake ports 18 of the valve casing are connected to an intake manifold. The outlet ports 37 of the precompression chambers are connected to the upper intake ports of unalined valve casings by pipes 34, 35 and 36. On the downstroke of the piston a charge is drawn into each precompression chamber. This is compressed on the upstroke of the piston and, when the piston is at lower dead-center, it is admitted to an unalined combustion chamber where it is further compressed before the explosion takes place.

From the description of the parts given above, the operation of my device should be very readily understood. In the internal combustion engine shown in my patent application, Serial Number 67313, I use a piston valve having straight passages extending transversely through the valve piston. In such a construction, if the valve piston does not fit tightly in the casing, there is a possibility that gas might leak from one part to the other by passing around the valve piston between it and the wall of the valve casing. To obviate such a possibility, in the present construction I provide compression rings on the piston valve so located that they seal the coöperating ports from each other and prevent a loss of compression through leakage of the valve. The port 18 is connected with port 16 by passage 20. The piston valve 12 carries the compression rings 27 between the ends of the passage 20 and no matter what position the piston valve occupies, at least one of the rings 27 will be between port 15 and port 18 to prevent the leakage of gas from one port to the other. Similarly the compression rings 26 are located between the ends of passage 19 which connects ports 15 and 17, and at least one of these rings 26 will always be between ports 15 and 17 to prevent leakage of gas from one port to the other.

When the piston approaches the upper limit of its stroke, the compressed gas in the pre-compression chamber 6 exerts a pressure against the side of the piston valve 12 through the port 16. To equalize this pressure I provide the annular groove 28 so that the compressed gas can fill this groove and exert its pressure on the piston valve 12 equally from all sides. This eliminates any objectional side thrust due to this pressure.

This valve has been especially designed for use in connection with the type of internal combustion engine which I have referred to. My invention is, however, not limited to use in this connection but can be used wherever a piston valve is applicable to control the flow of a fluid. I have shown a reciprocating piston valve but my invention would also be applicable to a rotary valve in which the rotation of the valve brings the passage in line with the ports.

I am aware that the particular embodiment of my invention, which I have here shown and described, is susceptible of considerable variation without departing from the spirit of my invention, and therefore, I do not wish to be restricted to the specific structure here shown, except as required by the appended claims. I have found, however, that this particular structure is very desirable from many standpoints, and therefore, I desire to claim the same specifically, as well as broadly, as indicated by the appended claims.

Having thus described my invention, what I claim as new and desire to secure by Letters Patent is:

1. In a device of the class described, the combination of a valve casing provided with a pair of inlet ports and a pair of outlet ports, said inlet ports being out of alinement with said outlet ports, a piston valve reciprocable in said valve casing and provided with passages adapted to connect said inlet ports with said outlet ports at certain positions of said piston valve, one end of each of said passages being higher than the other, a compression ring carried by said piston valve above the upper passage, a pair of compression rings carried by said piston valve between the ends of the upper passage, a second pair of compression rings carried by said piston valve between the ends of the lower passage, and an annular groove formed in said piston valve between the second pair of rings.

2. In a device of the class described, the combination of a valve casing provided with a pair of inlet ports and a pair of outlet ports, said inlet ports being out of alinement with said outlet ports, a piston valve reciprocable in said valve casing and provided with passages adapted to connect said inlet ports with said outlet ports at certain positions of said piston valve, one end of each of said passages being higher than the other, and compression rings carried by said piston valves between the lower and upper end of each of said passages.

3. In a device of the class described, the combination of a valve casing, having inlet and outlet ports, one of said ports communicating with a chamber in which a fluid is compressed, a piston valve reciprocable in said casing and provided with a passage adapted to connect said ports at a certain position of the piston valve, and an annular groove formed in said piston valve so as to be brought into line with the port communicating with said chamber.

In witness whereof I have hereunto set my hand and seal.

DESIRÉ V. BOUREAU.